United States Patent
Niu

(10) Patent No.: US 10,073,198 B2
(45) Date of Patent: Sep. 11, 2018

(54) DISPLAY DEVICE

(71) Applicant: AU Optronics Corporation, Hsin-Chu (TW)

(72) Inventor: Tzu-Ling Niu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 245 days.

(21) Appl. No.: 15/252,285

(22) Filed: Aug. 31, 2016

(65) Prior Publication Data
US 2017/0082784 A1 Mar. 23, 2017

(30) Foreign Application Priority Data

Sep. 18, 2015 (TW) .............................. 104131026 A

(51) Int. Cl.
| | |
|---|---|
| *G02B 3/00* | (2006.01) |
| *G02B 3/06* | (2006.01) |
| *G02B 7/02* | (2006.01) |
| *G02B 13/00* | (2006.01) |
| *G02B 23/24* | (2006.01) |
| *G02B 7/00* | (2006.01) |
| *G02B 23/16* | (2006.01) |

(52) U.S. Cl.
CPC ................ *G02B 3/06* (2013.01); *G02B 7/003* (2013.01); *G02B 7/02* (2013.01); *G02B 7/022* (2013.01); *G02B 7/026* (2013.01); *G02B 13/001* (2013.01); *G02B 23/16* (2013.01); *G02B 23/2476* (2013.01)

(58) Field of Classification Search
CPC .......... G02B 7/02; G02B 7/022; G02B 7/026; G02B 13/001; G02B 7/003; G02B 23/16; G02B 3/06; G02B 23/2476

USPC .......................... 359/718, 809, 815, 818, 819
See application file for complete search history.

(56) References Cited

U.S. PATENT DOCUMENTS

| | | | |
|---|---|---|---|
| 6,927,908 B2 | 8/2005 | Stark | |
| 9,955,602 B2 * | 4/2018 | Wildner | ............ G02F 1/133308 |
| 2004/0239836 A1* | 12/2004 | Chase | ................. H04M 1/0214 |
| | | | 349/98 |
| 2008/0217642 A1* | 9/2008 | Takekuma | .............. H01L 33/58 |
| | | | 257/99 |
| 2010/0302195 A1 | 12/2010 | Wang et al. | |

(Continued)

FOREIGN PATENT DOCUMENTS

| | | |
|---|---|---|
| CN | 203260276 U | 10/2013 |
| CN | 102460281 B | 8/2014 |

(Continued)

*Primary Examiner* — Evelyn A Lester
(74) *Attorney, Agent, or Firm* — McClure, Qualey & Rodack, LLP

(57) ABSTRACT

A display device is provided. The display device includes a display module and a cover lens. The display module has a display area and a non-display area aside the display area. The cover lens which is disposed on the display module and covers the same includes a convex lens portion and a cover portion, wherein the convex lens portion has a convex cover surface facing the display area, the cover portion is connected to a side of the convex lens portion opposite to convex cover surface; the cover portion also has a fringe extending outsides the convex lens portion. The cover portion has an outer surface which includes a central area and a cambered surface connected to the central area and corresponding to the fringe.

20 Claims, 6 Drawing Sheets

(56) References Cited

U.S. PATENT DOCUMENTS

| | | | |
|---|---|---|---|
| 2011/0050657 A1* | 3/2011 | Yamada | H01L 27/3293 |
| | | | 345/204 |
| 2011/0285934 A1 | 11/2011 | Watanabe | |
| 2012/0069273 A1 | 3/2012 | Watanabe | |
| 2013/0002133 A1* | 1/2013 | Jin | H01L 51/5253 |
| | | | 313/511 |
| 2014/0198436 A1* | 7/2014 | Lim | H04M 1/0266 |
| | | | 361/679.01 |
| 2015/0002437 A1 | 1/2015 | Wang et al. | |
| 2015/0211707 A1* | 7/2015 | Watanabe | G02F 1/133308 |
| | | | 345/667 |

FOREIGN PATENT DOCUMENTS

| | | |
|---|---|---|
| CN | 104049408 A | 9/2014 |
| CN | 204257138 U | 4/2015 |
| TW | 201140155 A | 11/2011 |

\* cited by examiner

DISPLAY DEVICE

BACKGROUND

Field of the Disclosure

The present invention generally relates to display devices. More specifically, the present invention relates to display devices with frame borders having reduced visually.

Description of the Related Art

Display modules are used in a wide variety of display devices. A display module may be combined with a display device system frame to form an increasingly light and thin display device. In addition to appearance pursuits, a system frame primarily has functions of accommodating a display module and providing protection. However, a frame can still be visible even if a system frame is designed light and thin for a pursuit of narrow frame border on the premise of satisfying a strength need, which more or less influences visual aesthetic and device appearance. In another aspect, a display module may be provided with a cover lens. The cover lens, in one aspect, adjusts the visual aesthetics of the display module, and in a second aspect, enables the display module to have additional functions, such as three-dimensional display, touch function, anti-scratch, anti-shock, anti-glare, and anti-reflection, due to the cover lens being in addition to the image display. The cover lens may be laminated to a display panel of the display module by means of an adhesive material, or may be disposed on a display surface of the display module through a support structure.

The cover lens may form a special shape at edges, thereby achieving the foregoing effect of adjusting visual aesthetics. However, an outer portion of a conventional cover lens has a relatively large thickness; and the problem that a system frame border can be viewed which influences visual aesthetic cannot be solved by using the conventional cover lens. Discontinuous joint lines produced between the conventional cover lens and the system frame border also influence the device appearance.

SUMMARY OF THE DISCLOSURE

An objective of the present invention is to provide a display device having an effect of visually reducing a frame border width.

Another objective of the present invention is to provide a display device, provided with an optical element having functions of adjusting an image and providing support.

The display device of embodiments of the present invention includes a display module and a cover lens. The display module has a display area and a non-display area. The cover lens which covers the display module includes a convex lens portion and a cover portion, where the convex lens portion has a convex cover surface facing the display area, the cover portion is connected to a side of the convex lens portion opposite to the convex cover surface, and the cover portion also has a fringe extending outside the convex lens portion. The cover portion has an outer surface, and the outer surface includes a central area and a cambered surface located at outer edges of the central area and connected between the central area and the fringe.

The display module of the present invention also has a display area, where the display area generates a display image. The cover lens also includes a first portion and a second portion, disposed on the display area and covering the same, and configured to receive the display image. The first portion of the cover lens is disposed to face the display area, and the second portion is connected to a side of the first portion opposite to the display area, and has a fringe at least partially extending outside the first portion. The first portion is configured to enlarge the whole display image to generate an enlarged image, and the second portion further enlarges edges of the enlarged image, so as to generate an output image.

The enlarged image modifies the frame or the edges of the display area for reducing visual interference from the frame or the edges of the display area; the output image modifies the system edges for reducing visual interference from the system edges, and producing an effect of equivalently borderless or being with a narrow frame border.

DESCRIPTION OF THE ILLUSTRATED EMBODIMENTS

Figure 1A:
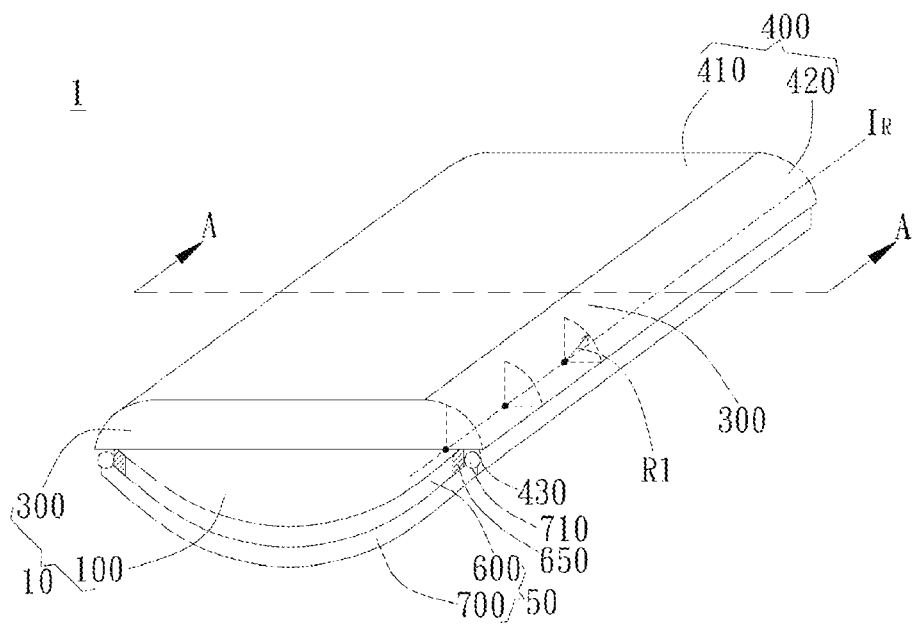
FIG. 1A and FIG. 1B are schematic diagrams of a display device according to an embodiment of the present invention.
Figure 1B:
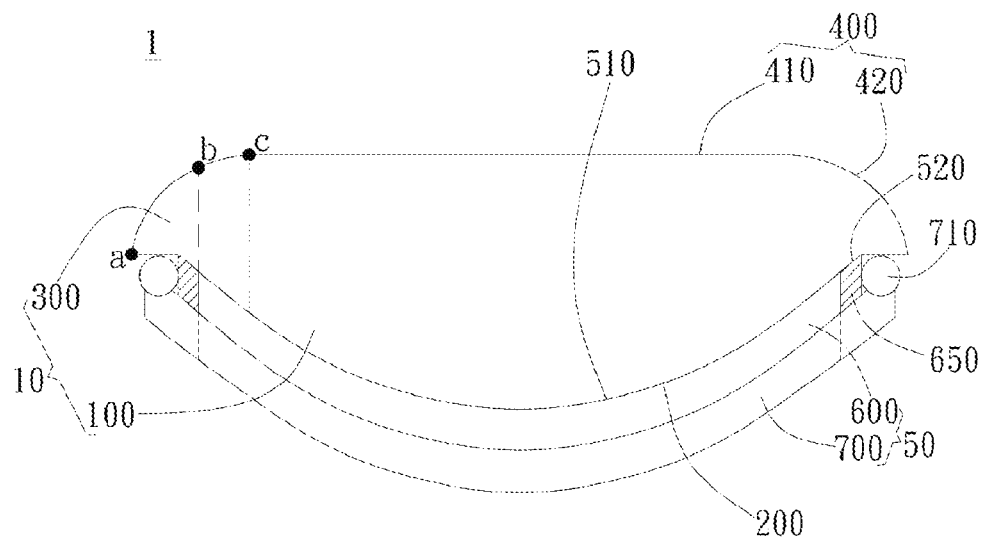

FIG. 1A and FIG. 1B are schematic diagrams of a display device according to an embodiment of the present invention. As shown in the cross-sectional view in FIG. 1B, a display device 1 includes a display module 50 and a cover lens 10, where the display module 50 may embody any of a variety of display technologies. For example, it may be a thin film transistor liquid crystal display module (TFT-LCD), an organic light emitting diode display module (OLED), an electrophoretic display module, a liquid crystal on silicon display module (LCOS), and other display modules. In this embodiment, the display module 50 is a curved display module, which includes a display panel 600, which is generally a direct element configured to display an image, and the display panel 600 includes a display area 510 and a non-display area 520. The display area 510 is located in a central region of the display panel 600 relative to the non-display area 520 and is configured to generate a display image. In contrast, the non-display area 520 is located around the side edges of the display area 510, for example, two opposite edges or peripheries of the display area 510. In other words, the non-display area 520 generally corresponds to the edges of the display panel 600. In an embodiment in which the display module 50 is a curved display module, the display panel 600 has a curved surface, for example, an arced surface, which extends along a direction parallel to a curvature center axis (not shown); it should be noted herein that cross sections of the arced surface at different positions have respective centers of curvature, and multiple centers of curvature are connected to form the foregoing curvature center axis. Alternatively, the display panel 600 may be a free-form curvature surface, and the free-form curvature surface may be at least partially an arced surface.

In this embodiment, the display area 510 is a part of the display panel 600 that displays an image, and corresponds to a pixel area, inside the display panel 600, for controlling light; and the non-display area 520 is a part, surrounding the display area 510 or at two edges of the same, that does not display an image, and corresponds to a shading area, a wire area, a driving circuit area or other edge areas inside the display panel 600. Further, the display panel 600 is provided with a black matrix 650 (BM) extending along the side edges of the display panel 600 and corresponding to the non-display area 520. Generally, an area inside the black matrix 650 is the display area 510, and the black matrix 650 and the part outside the same are the non-display area 520. Inner edges of the black matrix 650 may be regarded as a border or edge of the display area 510. In addition, in this embodiment of the present invention, the black matrix 650 corresponds to the edges of the display panel 600; the outer edges of the black matrix 650 in the drawings may represent the edges of the display panel 600.

As shown in FIG. 1A and FIG. 1B, the cover lens 10 is disposed on the display module 50 and covers the same. In this embodiment, the cover lens 10 may be directly connected to a display surface of the display module 50 by means of an optical adhesive or in other manners, and covers the display panel 600 to receive a display image generated on the display area 510. However, in different embodiments, a medium such as air (or ambient space) may be also sandwiched between the cover lens 10 and the display module 50.

Figure 2:
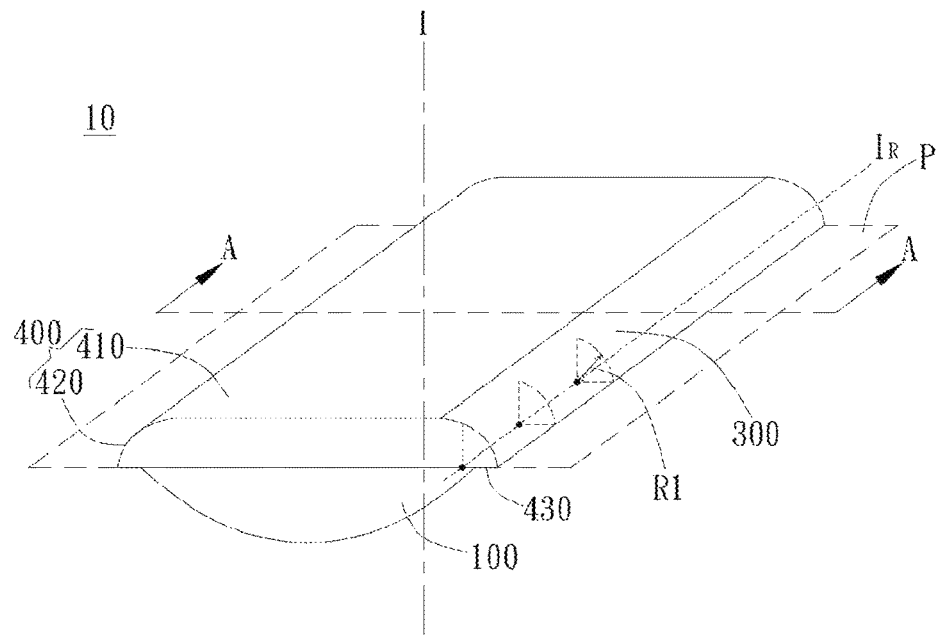
FIG. 2 is a perspective diagram of a cover lens according to an embodiment of the present invention.
Figure 3:
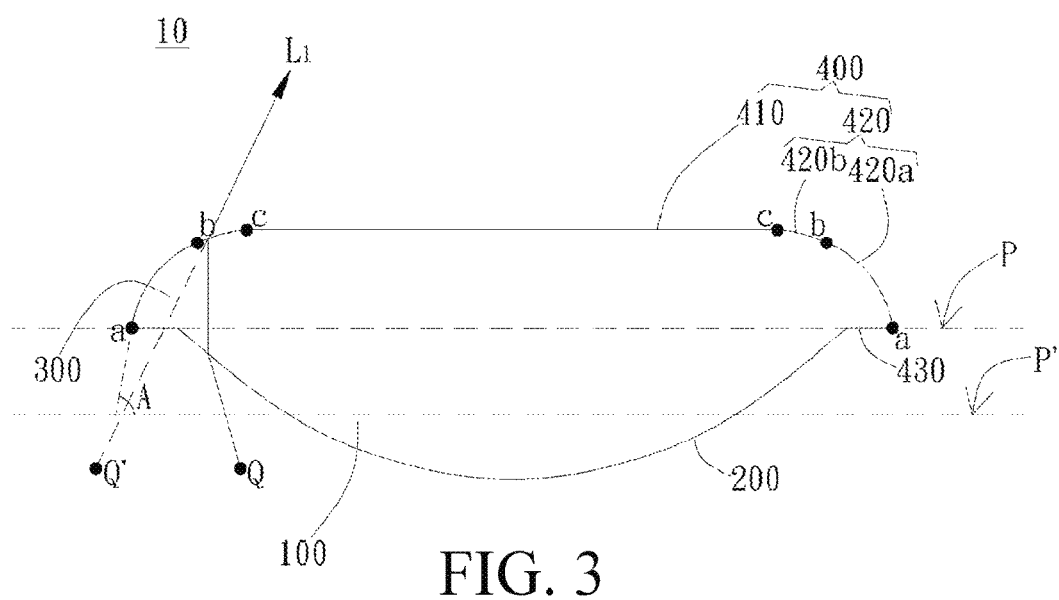
FIG. 3 is a sectional view of the embodiment in FIG. 2.

Reference is now made to FIG. 2 and FIG. 3 FIG. 2 is a perspective diagram of the cover lens 10 according to the embodiment of the present invention, and FIG. 3 is a cross-sectional view of the cover lens 10 along a line AA in FIG. 2. As shown in FIG. 2 and FIG. 3, the cover lens 10 includes a first portion and a second portion, where the first portion faces the display panel 600, and the second portion is connected to a side of the first portion opposite to the display panel 600 and at least partially extends outside the first portion. The first portion enlarges the display image generated by the display area 510 to generate an enlarged image; the second portion further enlarges edges of the enlarged image, to collectively generate an output image. The enlarged image may be further modified by the second portion to modify the border or the edges of the display area 510 to reduce visual interference from the border or the edges of the display module 510; thus, the output image has been modified to ignore the system edges by reducing visual interference from the system edges, and producing an effect of equivalently being without a border or being with a narrow frame border.

In a specific embodiment of the present invention, the first portion and the second portion are a convex lens portion 100 and a cover portion 300, respectively. The convex lens portion 100 and the cover portion 300 may each be independent components which are joined to collectively form the cover lens 10, or the cover lens 10 may be formed integrally to include the convex lens portion 100 and the cover portion 300. The cover lens 10 is disposed in a manner such that the convex lens portion 100 faces the display module 50. When being formed integrally by a homogeneous material, the convex lens portion 100 and the cover portion 300 have a same refractive index. For example, the material of the cover lens 10 may be polymethylmethacrylate (PMMA) and has a refractive index of 1.49, or may be glass. At least one part of an outer surface of the convex lens portion 100 is a convex cover surface 200 facing the display panel 600. In an embodiment, the convex lens portion 100 may be in a semi-cylindrical shape or may be in a partial cylinder shape, the convex cover surface 200 may be formed into a cylindrical arced surface, for example, a curved surface of a semicircular tube surface or a partially circular tube surface, or an at least partially cylindrical arced surface or an aspheric arced surface. In this embodiment, the convex cover surface 200 extends along a direction parallel to a long axis of the convex lens portion 100 or a curvature center axis. It should be noted that cross sections of the convex cover surface 200 at different positions have respective centers of curvature, and multiple centers of curvature are connected to form the foregoing curvature center axis, or when the convex lens portion 100 is assumed as a cylinder, the curvature center axis is a center axis of the cylinder. The curvature center axis herein is approximately the same as the foregoing curvature center axis along which the display panel 600 of the curved display module extends; in addition, the curved surface of the display panel 600 may be approximately the same as the arced surface of the convex cover surface 200 in respect of a curvature or a curvature change, so that the curved surface and the arced surface are complementary to each other and the display panel 600 is attached to the convex cover surface 200. In other embodiments, on the premise that assembly and combination can be implemented in processing, the curvature or the curvature change of the curved surface of the display panel 600 may be also different from those of the arced surface of the convex cover surface 200.

In another aspect, the cover portion 300 of the cover lens 10 is connected to a side of the convex lens portion 100 opposite to a side of the same having the convex cover surface 200. In other words, when the display module 50 is disposed on one side of the cover lens 10, the cover portion 300 is located at a side of the convex lens portion 100 opposite to the display module 50, and preferably, at an outer side of the display device 1. In addition, it should be understood that the cover lens 10 is not limited to the rectangular plate shown in FIG. 2.

The cover portion 300 has a fringe area 430 extending outside the convex lens portion 100, that is, the cover portion 300 protrudes relative to the convex lens portion 100. In addition, an outer surface 400 of the cover portion 300 includes a central area 410 and a cambered surface 420 opposite to and away from the center of the cover portion 300, and the cambered surface 420 is a convex cambered surface extending along a direction parallel to a curvature center axis $I_R$; in other words, the cover portion 300 has a chamfered edge or border. The fringe 430 of the cover portion 300 extending outward relative to the convex lens portion 100 is coupled to the cambered surface 420, and there an end of the cambered surface 420 away from the central area 410, that is, a tail end of the cover portion 300, is the chamfered edge to facilitate manufacturing. In addition, for the cambered surface 420, the part of the central area 410 of the outer surface 400 may be a plane or may be a curved surface; in this embodiment, the central area 410 is a plane; however, in another embodiment, the central area 410 may be a curved surface, and a bending radian of the central area 410 is preferably less than a bending radian of the cambered surface 420, in other words, the curvature of the central area 410 is less than the curvature of the cambered surface 420, or the change from the curvature of the cambered surface 420 to the curvature of the central area 410 is gradual in a descending order in segments, or is planar and continuous. In a variant embodiment, the cambered surface 420 may be formed into a Fresnel lens or an outer convex surface similar to a Fresnel lens. In addition, it should be understood that the cambered surface 420 is not limited to the case where extending is performed along two opposite edges of the cover lens 10, as shown in FIG. 2, and for example, each of four edges of the cover portion 300 may be formed with a cambered surface. In this way, corresponding to the cover portion 300 shown in FIG. 2, the convex cover surface 200 is formed into a cylindrical cambered surface, for example, a semicircular tube surface or an at least one partially cylindrical arced surface or an aspheric arced surface, where a curvature of the cambered surface 420 of the cover portion 300 and a curvature of the convex cover surface 200 of the convex lens portion 100 can be seen from a cross section in an identical direction with the cover portion 300 and the convex lens portion 100 (for example, the sectional view of the cover lens 10 along a line AA); however, the present invention is not limited thereto. For example, the convex cover surface is formed into a spherical arced surface, and a curvature of the convex cover surface having a spherical surface can be also seen on a cross section in a direction vertical to the line AA.

Figure 4:
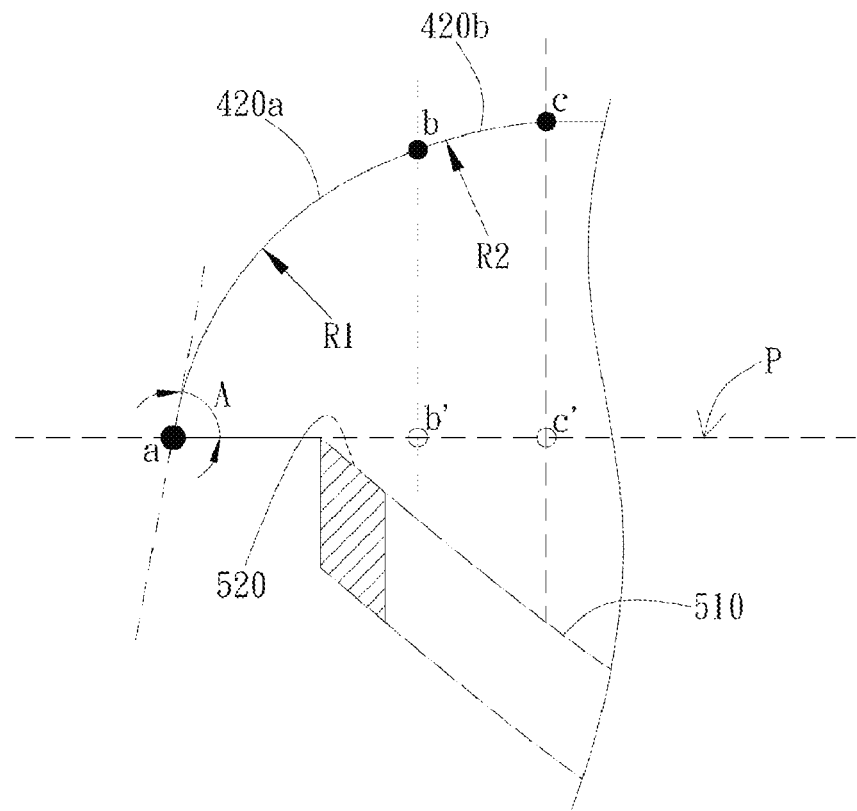
FIG. 4 is a partial enlarged diagram of the embodiment in FIG. 1 of the present invention.

In this embodiment, as shown in FIGS. 3 and 4, the cambered surface 420 further includes different sections, such as a first cambered section 420a and a second cambered section 420b; for example, the first cambered section 420a differs from the second cambered section 420b in curvature (e.g., different radius of curvature). By performing description with the embodiments shown in FIG. 2 and FIG. 3, the first cambered section 420a is located at an outermost edge of the cambered surface 420 and ends at an intersection point between the cambered surface 420 and the fringe 430; the second cambered section 420b extends from the first cambered section 420a to the central area 410. The first cambered section 420a has a curvature R1, and the second cambered section 420b has a curvature R2. In addition, the first cambered section 420a and the second cambered section 420b of the cambered surface 420 may each include more than two sections with different curvature changes, for example, a curvature change from R'1 to R'n, where the curvature preferably decreases gradually or is gradually close to a plane from outside to inside, that is, in a direction towards the central area 410. In another aspect, a value of n of R'n may change according to a size of the display area 510. When the value of n is larger, and the curvature decreases gradually, this indicates that the cambered surface can change smoothly, as indicated.

As shown in FIG. 2 and FIG. 3, the cover lens 10 has a virtual reference surface P which is vertical to a normal line I passing through a center of the central area 410; in FIG. 2, the virtual reference surface P is indicated at a junction between the convex lens portion 100 and the cover portion 300. In another aspect, FIG. 3 shows a cross-sectional view in a direction perpendicular to the virtual reference surface P and in a direction along the line AA of FIG. 2. FIG. 4 is a partially enlarged sectional view in which the cover lens 10 is included. As shown in FIG. 4, in this cross section, the curvature R1 of the first cambered section 420a is greater than the curvature R2 of the second cambered section 420b. In addition, an end of the first cambered section 420a opposite to the second cambered section 420b intersects with the virtual reference surface P shown in the drawing to form an included angle A. In other words, a line tangential with the first cambered section 420a at an endpoint a forms an included angle A with the virtual reference surface P, or an included angle A is formed between the first cambered section 420a and the fringe 430, where the included angle A is in a range between 40° and 60°. The virtual reference surface P is not limited to the position shown in the drawings; for example, a virtual reference surface P' is parallel to P, and in this case, the line tangential with an end of the first cambered section 420a opposite to the second cambered section 420b extends to intersect with the virtual reference surface P' to form the included angle A, as shown in FIG. 3.

Apart from the curvature change, the range of the cambered surface 420 may also change. For example, a length by which the cambered surface 420 extends towards the central area 410 changes, where a projection of the cambered surface 420 on the virtual reference surface P may reflect the range thereof or the extension length, and the range change of the cambered surface 420 may be designed in combination with the display module 50. Preferably, as stated in the embodiment shown in FIG. 4, a projection of the cambered surface 420 on the virtual reference surface P extends into a range of a projection of the display area 510 on the virtual reference surface P; in other words, in the cross section shown in FIG. 4, a range of a projection a to c' of the cambered surface 420, from an endpoint a to a terminal point c, on the virtual reference surface P partially overlaps with the range of the projection of the display area 510 on the virtual reference surface P.

According to another aspect, as shown in the cross section in FIG. 4, a projection position b', of an intersection point b between the first cambered section 420a and the second cambered section 420b of the cambered surface 420, on the virtual reference surface P falls outside a range of a projection of the non-display area 520 on the virtual reference surface P; in other words, the projection b' of the point b on the virtual reference surface P falls within the range of the projection of the display area 510 on the virtual reference surface P, instead of falling within the range of the projection of the non-display area 520 on the virtual reference surface P, thereby optimizing an effect of enlarging an image of the display area 510 at the convex lens portion 100 and then enlarging an image at an edge by the cover portion 300 of the cover lens 10. For example, the point b' may overlap with a projection of an edge of the display area 510 on the virtual reference surface P. In the embodiment of the present invention, the non-display area 520 is located at an outermost edge of the display panel 600 of the display module 50.

By means of the design of the cambered surface 420, as shown in FIG. 3, the cover portion 300 deflects reflective light from the convex lens portion 100 to change a progressing direction of the light. Specifically, incident light, especially light from a position close to two edges of the convex lens portion 100, for example, a point Q, is deflected by the cover portion 300, and further is emergent in a direction towards the center, for example, light $L_1$. In this way, the convex lens portion 100 substantially enlarges the image wholly in an equal proportion, light beams at peripheries of the image, from the cover portion 300, and passing through a wide angle of view of deflection further adjusts and enlarges the image at edges, so as to achieve the effect of visually eliminating a system frame border. By using an image at the point Q in FIG. 3 as an example, the image at the point Q is enlarged and deflected by the cover lens 10 and then enters eyes of a viewer, where the viewer has a feeling that the image is located at a point Q' based on an image light path $L_1$ after the light is emergent from the cover lens 10; in other words, the cover lens 10 enlarges the image and transversely moves the same to achieve the objective of eliminating the frame. Therefore, when the cover lens 10 is used in the display device 1 and combined with a system frame of the display device 1, visual interference caused by a system frame border can be reduced after incident light from the device goes through such the light path adjustment and image adjustment; in other words, an effect of equivalently being without a border or being with a narrow border is produced.

Figure 5:
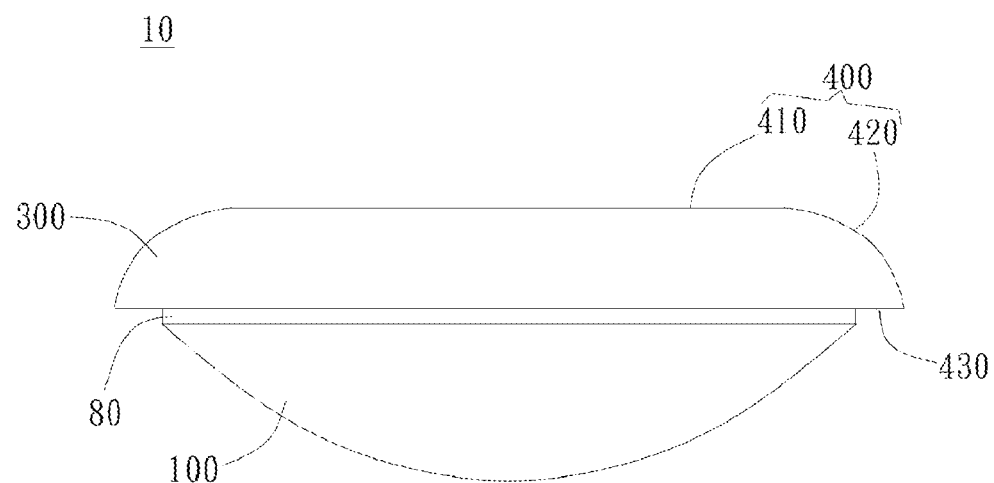
FIG. 5 is a schematic diagram of a cover lens according to another embodiment of the present invention.

The cover lens 10 may be formed integrally to include the convex lens portion 100 and the cover portion 300, or may be formed by joining independent components, such as the convex lens portion 100 and the cover portion 300, as shown in FIG. 5. In this embodiment, the convex lens portion 100 and the cover portion 300 may have a same refractive index or may have respective different refractive indexes. For example, the convex lens portion 100 has a first refractive index and the cover portion 300 has a second refractive index. Preferably, the first refractive index is less than or equal to the second refractive index, so that total reflection of light at an interface between the convex lens portion 100 and the cover portion 300 is avoided and an effect of enlarging an image in an equal proportion by the convex lens portion 100 and tuning a peripheral part of an image by the cover portion 300 can be achieved. When a difference between the first refractive index and the second refractive index is larger, the cover lens 10 of a smaller thickness can achieve the foregoing effect of light reflection and image adjustment, where the thickness direction is vertical to a direction of a connection between the convex lens portion 100 and the cover portion 300. In comparison, when the convex lens portion 100 and the cover portion 300 have the same refractive index, an expected effect can be achieved by changing the thickness of the cover lens 10; for example, in a case where the convex lens portion 100 and the cover portion 300 have the same refractive index, the thickness of the cover portion 300 is increased to achieve the expected effect. Even if the convex lens portion 100 and the cover portion 300 have the same refractive index, the cover lens 10 may have a smaller thickness as compared with that of a conventional cover at the portion of the cover portion 300 regardless of a maximum thickness of the cover lens 10, for example, 0.95 mm is provided in the embodiment of the present invention, while a conventional thickness is 3.5 mm, since the cover lens 10 of the present invention is formed by combining the cover portion 300 and the convex lens portion 100; therefore the display device is beautified and visual aesthetic of image display is improved.

When the convex lens portion 100 and the cover portion 300, which are separated members made of different materials, are coupled, optical properties of a adhesive material used for coupling the convex lens portion 100 and the cover portion 300 may be also taken into consideration, for example, OCA, glue, or UV adhesive. As shown in FIG. 5, the cover lens 10 comprises the convex lens portion 100, the cover portion 300, and a adhesive layer 80 formed by a adhesive material that connects the convex lens portion 100 and the cover portion 300. A refractive index of the adhesive layer 80 is different from the refractive index of the convex lens portion 100 and that of the cover portion 300, for example, the adhesive layer 80 has a third refractive index, and the third refractive index is preferably greater than or equal to the first refractive index and less than or equal to the second refractive index. In this way, the convex lens portion 100 having the first refractive index enlarges a display image generated by the display area 510, to generate an enlarged image; the cover portion 300 having the second refractive index further enlarges edges of the enlarged image, to generate an output image; the adhesive layer 80 having the third refractive index between the convex lens portion 100 and the cover portion 300 has a minimum influence on light entering the cover portion 300 from the convex lens portion 100 on a path of the light.

Figure 6:
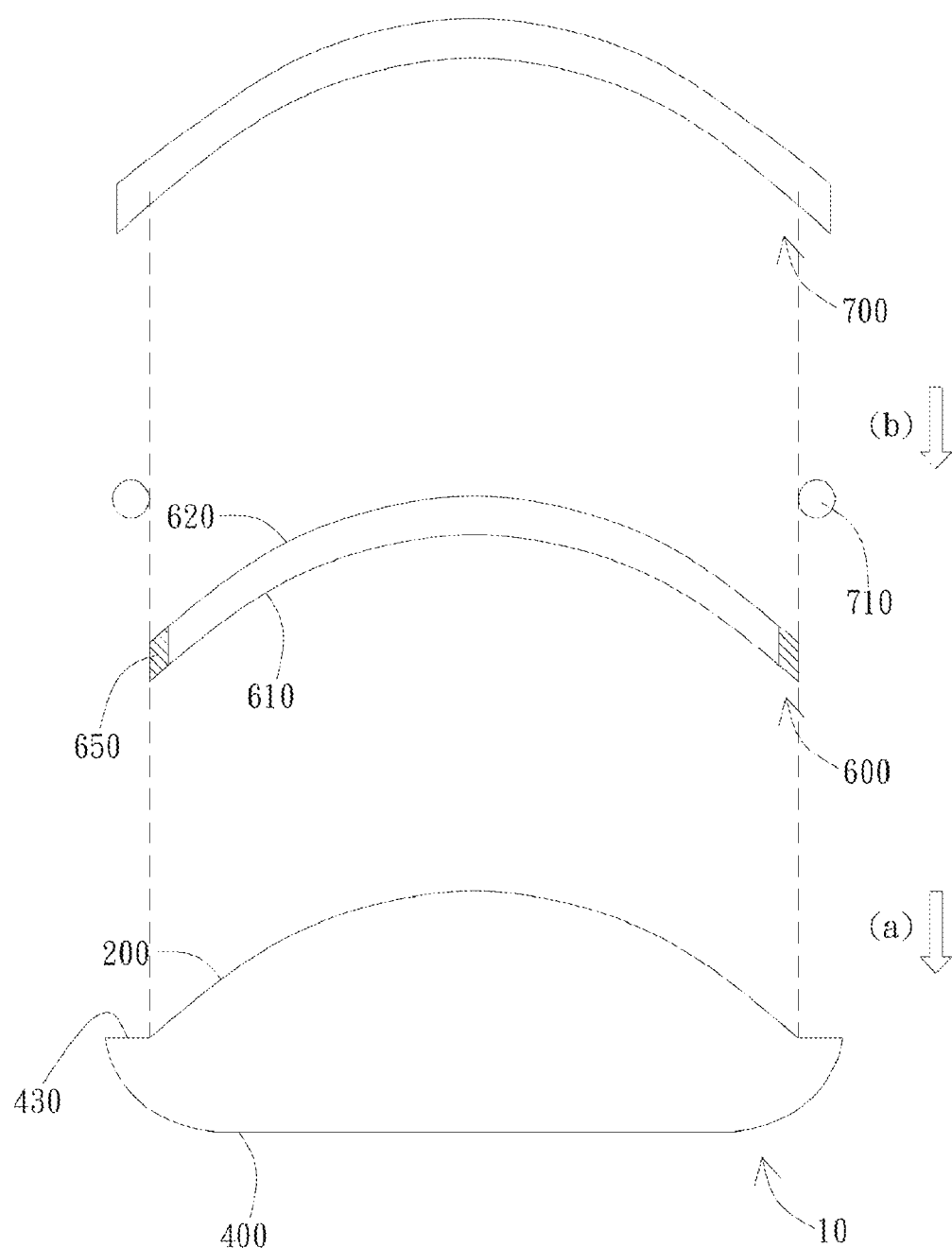
FIG. 6 is an exploded view of a display device according to an embodiment of the present invention.

FIG. 6 is an exploded view of the display device 1, where the display module 50 includes the display panel 600 and a backlight module 700. As shown in FIG. 6, the display panel 600 is a curved display panel and has a concave panel surface 610 and a convex panel surface 620 opposite to each other. When the cover lens 10 is disposed on the display module 50 and covers the same, the display panel 600 is face to the convex lens portion 100 of the cover lens 10, and the convex cover surface 200 covers the concave panel surface 610, where the edges of the display panel 600 are preferably contracted inward as compared with the fringe 430 of the cover lens 10.

Figure 7:
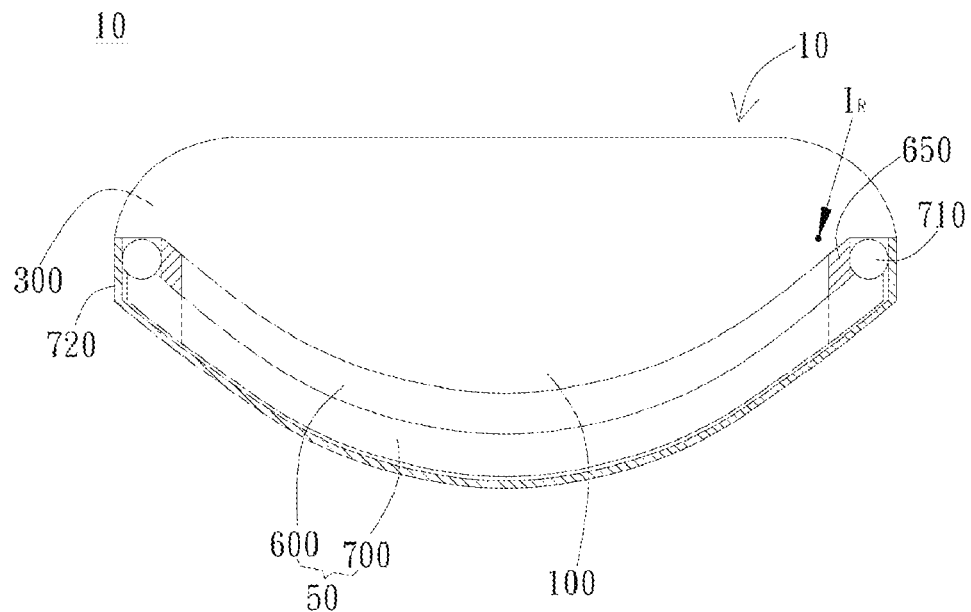
FIG. 7 is a schematic diagram of a display device according to another embodiment of the present invention.

In a specific embodiment of the present invention, the edges of the display panel 600 fall within the range of the convex cover surface 200; specifically, a projection, of the edges of the display panel 600, that is, a part of the non-display area 520 that abuts the display area 510, on the virtual reference surface P falls within the range of the projection of the convex cover surface 200 on the virtual reference surface P. By using the embodiment shown in FIG. 6 as an example, the edges of the display panel 600 that are indicated by the black matrix 650 fall within the range of the convex cover surface 200. In another aspect, the backlight module 700 is a curved backlight module, combined with the convex panel surface 620 of the display panel 600 and disposed on the same. The backlight module 700 may be designed without a support sidewall, for example, without using a frame, or with a sidewall part whose frame is omitted. Without using a frame, emergent light of a backlight module at a wide angle of view can be increased and further an effect of enlarging an image is enhanced. Moreover, the function of providing a mechanical strength for supporting a backlight module that originally needs to be provided by the frame may be provided by the cover lens 10. The backlight module 700 protrudes outside the edges relative to the display panel 600. In an embodiment of the present invention, the backlight module 700 has a support sidewall 720, and the support sidewall 720 is located in at least one side of the curvature center axis $I_R$ vertical to a cylindrical arced surface; as shown in FIG. 7, the support sidewall 720 may be a bezel or a sidewall of the frame of the backlight module 700.

FIG. 6 illustrates a part of an assembly process, where a display device 1 is formed by sequentially superposing a cover lens 10, a display panel 600, and a backlight module 700. As shown in FIG. 6, in the assembly process, for example, in step (a), the concave panel surface 610 of the display panel 600 covers the convex cover surface 200 of the cover lens 10, where the concave panel surface 610 is a display surface; for another example, in step (b), the curved backlight module 700 is disposed on the convex panel surface 620. In addition, in step (a), the display panel 600 may be pasted to the cover lens 10 or assembled to the same in a mechanical manner, where the display panel 600 may be pasted thereto by using a material such as an OCA material or a glue; or, the display panel 600 and the convex cover surface 200 are opposite to each other with an air layer provided between the both. A step of disposing an adhesive body 710 is further included between step (a) and step (b). The adhesive body 710 may be disposed between outer sides of a black matrix 650 of the display panel 600 and a fringe 430 of the cover lens 10. When the curved backlight module 700 is disposed on the convex panel surface 620, the adhesive body 710 connects the fringe 430 and a part of the backlight module 700 protruding outside the edges of the display panel 600. In this way, the cover lens 10 also has a function of supporting and securing the backlight module 700 apart from optical functions. The adhesive body 710 may be a UV adhesive, for example.

Figure 8:
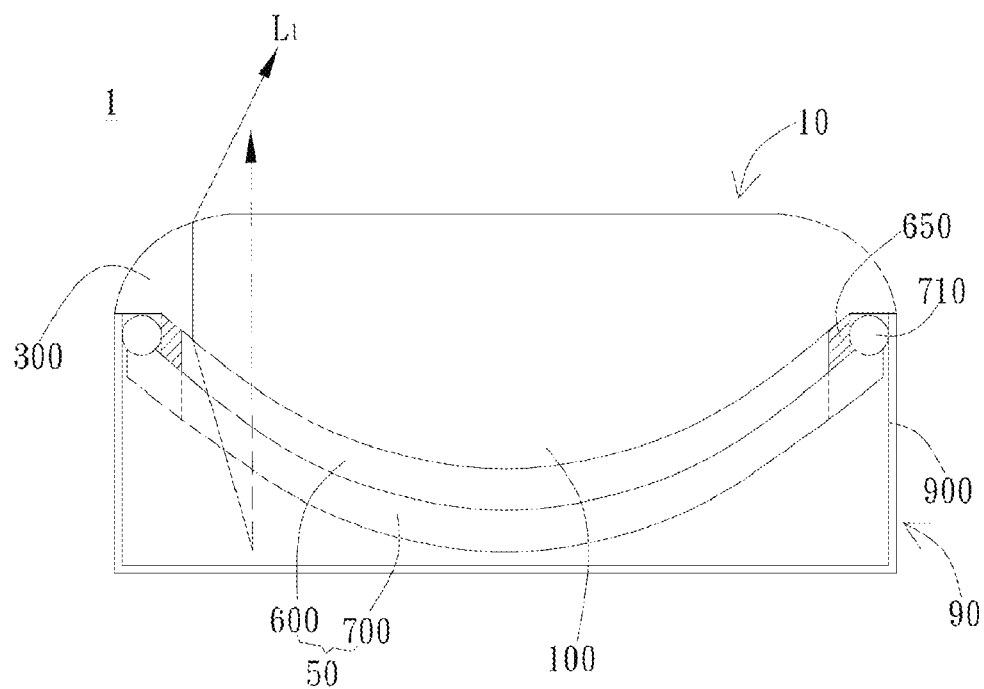
FIG. 8 is a schematic diagram of a display device according to still another embodiment of the present invention.

FIG. 8 is a schematic diagram of a display device according to another embodiment of the present invention. As shown in FIG. 8, the display device 1 further includes a system frame 90; the display module 50 is accommodated in the system frame 90. The system frame 90 has a sidewall 900. Preferably, a top portion of the sidewall 900 is covered by the fringe 430 of the cover portion 300 protruding outside the convex lens portion 100. Therefore, when the display device 1 is viewed from above, that is, when the display area is viewed in the front, it is not easy to see the system frame 90 theoretically.

Figure 9A:
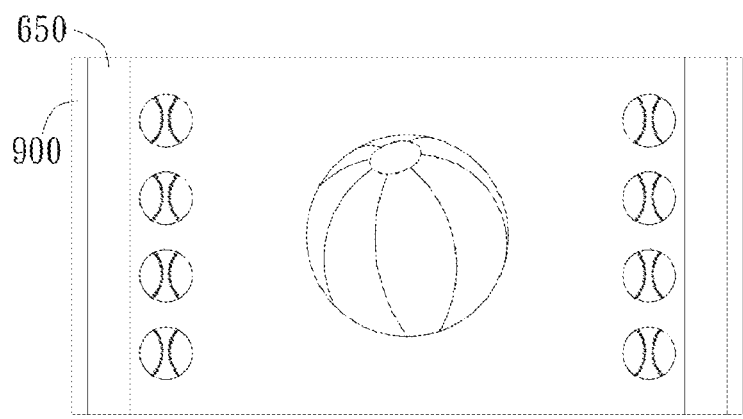
FIG. 9A to FIG. 9C are schematic diagrams of display effects of the prior art and the present invention.
Figure 9B:
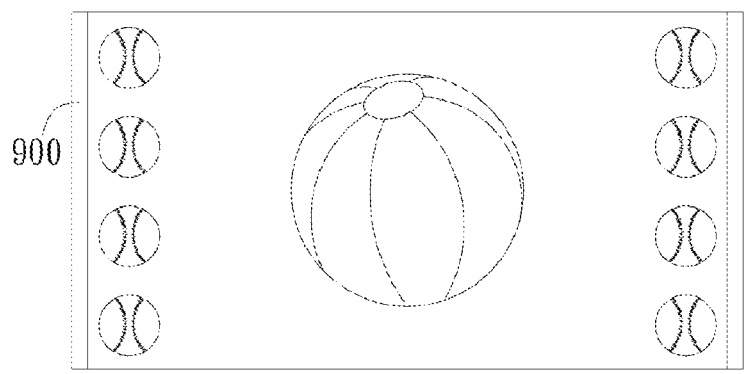
Figure 9C:
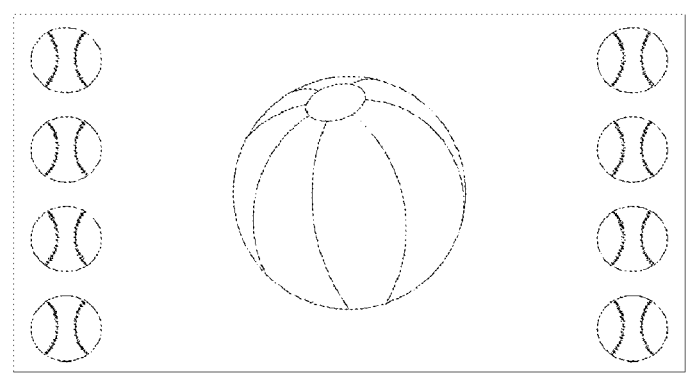

As stated above, by designing a cambered surface 420, the cover portion 300 deflects reflective light from the convex lens portion 100 to change a progressing direction of the light, thereby enlarging an image and enlarging peripheries of the image, where an optical path influenced by the cover lens 10 is indicated by $L_1$, and emergent light that is not processed by the cover lens 10 is indicated by a broken line and an arrow. Therefore, after such the optical path adjustment and image adjustment on the system frame 90 with which the cover lens 10 is combined, visual interference caused by frame edges thereof can be reduced; in other words, an effect of equivalently being without a border or being with a small border is produced. For actual effects, reference can be further made to FIG. 9A to FIG. 9C. FIG. 9A shows an image that is not yet adjusted by the cover lens 10, and at this time, the image range substantially reflects a range of the display area 510; in other words, the border or edges of the display area 510 and the system frame 90 reasonably surround the image. FIG. 9B and FIG. 9C display effects of processing the image by the cover lens 10 in the same system architecture, where FIG. 9B shows an image enlarged by the convex lens portion 100 of the cover lens 10; the enlarged image modifies the border or the edges of the display area 510, to reduce visual interference from the border or the edges of the display area. FIG. 9C follows FIG. 9B; edges of the enlarged image are further adjusted and enlarged by the cover portion 300, to achieve an effect of visually eliminating the system frame 90, that is, it is not easy to see the system frame 90 when the display device 1 is viewed from above. For optical principles for achieving this effect, reference can be made to the schematic diagram of the light path in FIG. 3. Further, as shown in FIG. 2, in the embodiment in which the cambered surface 420 is located at two opposite sides of the cover lens 10, the image is majorly moved transversely and enlarged at two sides corresponding to the cambered surface 420, as shown in FIG. 9B; edges of the image that is transversely moved and enlarged are further adjusted and enlarged by the cover portion 300, as shown in FIG. 9C. However, in other embodiments, the image may be enlarged by means of enlarging only one edge of the same, or by enlarging right and left edges or upper and lower edges corresponding to the cambered surface, or by enlarging three edges thereof; in addition, the present invention is not limited to a quadrangular display either, and the present invention may be also a display with any frame border, where at least one edge thereof is adjusted and enlarged. In addition, a backlight module without a frame may be also combined in the present invention. For example, emergent light of the backlight module at a wide angle of view without influences of a frame is regulated by the cover lens, so as to produce the expected effect of the present invention.

The present invention is described in the foregoing relevant embodiments; however, the foregoing embodiments are only examples for implementing the present invention. It needs to be noted that the disclosed embodiments are not intended to limit the scope of the present invention. On the contrary, modifications and equivalent arrangements within the spirit and scope of the application patent all fall into the scope of the present invention.

What is claimed is:

1. A display device, comprising:
   a display module, having a display area and a non-display area outside the display area; and
   a cover lens, covering the display area and the non-display area of the display module, comprising:
   a convex lens portion, having a convex cover surface facing the display area; and
   a cover portion, connected to a side of the convex lens portion opposite to the convex cover surface, and having a fringe extending outside the convex lens portion,
   wherein the cover portion has an outer surface, and the outer surface comprises a central area and a cambered surface located at outer edges of the central area and connected between the central area and the fringe.

2. The display device according to claim 1, wherein the cambered surface comprises:
   a first cambered section, located at an outermost edge of the cambered surface and connected to the fringe; and
   a second cambered section, extending from the first cambered section to the central area,
   wherein a curvature of the first cambered section is greater than a curvature of the second cambered section.

3. The display device according to claim 2, wherein the central area has a central normal line, the cover lens has a virtual reference surface perpendicular to the central normal line and located at a junction between the convex lens portion and the cover portion, and an included angle between the first cambered section and the virtual reference surface is in a range between 40° and 60°.

4. The display device according to claim 2, wherein the central area has a central normal line, the cover lens has a virtual reference surface perpendicular to the central normal line and located at a junction between the convex lens portion and the cover portion, and a projection, of a junction between the first cambered section and the second cambered section, on the virtual reference surface falls within a range of a projection, of the display area of the display module, on the virtual reference surface.

5. The display device according to claim 1, wherein the central area has a central normal line, the cover lens has a virtual reference surface perpendicular to the central normal line and located at a junction between the convex lens portion and the cover portion, and a range of a projection, of the cambered surface, on the virtual reference surface is partially overlapped with a range of a projection, of the display area of the display module, on the virtual reference surface.

6. The display device according to claim 5, wherein the range of the projection of the display area on the virtual reference surface falls within a range of a projection of the convex cover surface on the virtual reference surface.

7. The display device according to claim 1, wherein the display area is at least partially an arced surface facing the convex cover surface.

8. The display device according to claim 1, wherein the display module comprises a curved display panel, having a concave panel surface and a convex panel surface opposite to each other, and the concave panel surface covers the convex cover surface of the cover lens.

9. The display device according to claim 8, wherein the display module further comprises a curved backlight module, disposed on the convex panel surface, and the curved backlight module is designed without a support sidewall.

10. The display device according to claim 8, wherein the display module further comprises a curved backlight module, disposed on the convex panel surface, and the curved backlight module is provided with a support sidewall, for supporting the curved display panel and the cover lens.

11. The display device according to claim 1, further comprising a system frame, the display module being accommodated in the system frame, wherein the system frame has a sidewall, and a top portion of the sidewall is covered by the fringe of the cover portion extending outside the convex lens portion.

12. The display device according to claim 1, wherein the cover lens is formed by jointing the convex lens portion and the cover portion that are independent.

13. The display device according to claim 1, wherein the cover lens is formed integrally.

14. The display device according to claim 12, wherein the convex lens portion has a first refractive index, the cover portion has a second refractive index, and the first refractive index is less than or equal to the second refractive index.

15. The display device according to claim 14, wherein the cover lens comprises a adhesive layer connected to the convex lens portion and the cover portion, wherein the adhesive layer has a third refractive index, and the third refractive index is greater than or equal to the first refractive index and is less than or equal to the second refractive index.

16. The display device according to claim 1, the convex lens portion and the cover portion are connected to each other in an integral manner.

17. A display device, comprising:
a display module, having a display area, wherein the display area is configured to generate a display image; and
a cover lens, disposed on the display area and covering the same, and configured to receive the display image, comprising:
a first portion, disposed to face the display area; and
a second portion, connected to a side of the first portion opposite to the display area, and having a fringe at least partially extending outside the first portion,
wherein the first portion is configured to enlarge the whole display image to generate an enlarged image, and the second portion is configured to further enlarge edges of the enlarged image, so as to generate an output image.

18. The display device according to claim 17, wherein the first portion is a convex lens portion, and an edge of an upper surface of the second portion corresponding to the fringe has a cambered surface.

19. The display device according to claim 18, wherein the upper surface further comprises a central area located inside the cambered surface, and the cambered surface comprises:
a first cambered section, located at an outermost edge of the cambered surface and connected to the fringe; and
a second cambered section, extending from the first cambered section to the central area,
wherein a curvature of the first cambered section is greater than a curvature of the second cambered section.

20. The display device according to claim 18, wherein the display module comprises a curved display panel, having a concave panel surface and a convex panel surface opposite to each other, and the concave panel surface is disposed corresponding to a convex surface of the convex lens portion.

* * * * *